United States Patent [19]

Auinger

[11] Patent Number: 5,270,634
[45] Date of Patent: Dec. 14, 1993

[54] POLYPHASE ALTERNATING CURRENT MOTOR

[75] Inventor: Herbert Auinger, Nürnberg, Fed. Rep. of Germany

[73] Assignee: Siemens Aktiengesellschaft, Berlin & Munich, Fed. Rep. of Germany

[21] Appl. No.: 743,479

[22] Filed: Aug. 8, 1991

[30] Foreign Application Priority Data

Aug. 17, 1990 [EP] European Pat. Off. ........ 90115792.5

[51] Int. Cl.⁵ .............................................. H02P 1/44
[52] U.S. Cl. .................................... 318/815; 318/817; 318/796
[58] Field of Search ............... 318/771, 796, 797, 812, 318/813, 815, 817, 745, 751, 767

[56] References Cited

U.S. PATENT DOCUMENTS

| | | |
|---|---|---|
| 1,712,237 | 5/1929 | Weichsel . |
| 1,715,866 | 6/1929 | Rother . |
| 4,187,457 | 2/1980 | Wanlass .............................. 318/729 |
| 4,446,416 | 5/1984 | Wanlass .............................. 318/812 |
| 4,808,868 | 2/1989 | Roberts ............................... 318/817 |

FOREIGN PATENT DOCUMENTS 0111635 9/1925 Switzerland .
2193384 2/1988 United Kingdom .

Primary Examiner—William M. Shoop, Jr.
Assistant Examiner—John W. Cabeca
Attorney, Agent, or Firm—Kenyon & Kenyon

[57] ABSTRACT

A polyphase alternating current motor has in addition to a main winding that can be connected to a voltage source, a auxiliary winding arranged in the stator, such that at least one condenser is connected to both windings per phase. A decrease in condenser size while at the same time improving the degree of effectiveness is possible by virtue of the fact that the main and auxiliary windings are arranged in such a way as to yield an increase and phase leading of the voltage adjacent to the condenser. The condensers are connected to the windings in such a way that only capacitative leakage current flows in the auxiliary winding and the geometrical total of active and leakage current flow in the main current.

22 Claims, 3 Drawing Sheets

POLYPHASE ALTERNATING CURRENT MOTOR

BACKGROUND OF THE INVENTION

The present invention relates generally to polyphase alternating current (AC) motors which have a main winding connectable to a voltage network and an auxiliary winding with the same phase number arranged in the stator. More particularly, the present invention relates to such an AC motor in which at least one condenser per phase is connected to the main and auxiliary windings and in which the conductors of the main and auxiliary windings are connected in series to increase the voltage applied to the condensers.

A polyphase AC motor is disclosed in U.S. Pat. No. 1,715,866. In this motor, the main and auxiliary windings are arranged so that the condenser voltage is in phase with the line voltage. As a result, it is possible to achieve the highest condenser voltage under otherwise identical conditions, thus achieving the smallest capacitance for the condensers. Similarly, the smallest no-load winding losses result. Since motors are normally operated only rarely at no-load, while they are, on the contrary operated predominantly under partial load conditions, it is a worthy goal if possible, for the minimum loss to occur within the range of partial load.

U.S. Pat. No. 4,187,457 discloses a motor in which in each phase, a condenser is wired in series with the main winding. As a result of the condensers, the average current density in the core of the stator is kept relatively high. Thus, high incoming currents are prevented from leading to currents in the motor that are too high. In addition, the condensers represent a form of overload protection. As a result of the auxiliary windings and the condensers, the operating characteristics should be improved, i.e., the way the motor behaves at start-up, the output factor, and the efficiency factor.

The present invention is directed to the problem of further developing a polyphase AC motor with main and auxiliary windings, one condenser per phase connected to the main and auxiliary windings, and in which the conductors of the main and auxiliary windings are connected in series to increase the voltage applied to the condensers, while also reducing losses in the range of the motor's load.

SUMMARY OF THE INVENTION

The present invention solves this problem by arranging the auxiliary windings such that the voltage applied to the respective condenser leads the network voltage applied to the main winding and by coupling the condensers to the windings so that in the auxiliary winding only the capacitive leakage current flows and in the main winding the geometric sum of the active and capacitive leakage current flows.

Since the condenser voltage leads the network voltage, the vector total from the condenser leakage current and the load-dependent active current in the main winding, given a certain partial load of the motor, results in a minimum current, and thus, in a minimum loss as well. Thus, in the remaining load range up to the full capacity of the motor, the losses are clearly lower.

In the case of reversible motors whose direction of rotation may be changed, it is necessary to reverse the auxiliary winding when changing the direction of rotation. This maintains the advantage that the condenser voltage leads the network voltage in the other direction of rotation as well.

Changing the ratio between the main winding and the auxiliary winding, or increasing the number of turns in the auxiliary winding, affects the condenser voltage, and thus changes the required capacitance. By shifting the axis of the auxiliary winding in the sense of condenser voltage with regard to the sequence of phase for the leading condenser load in the individual direction of rotation, it is possible to exert a favorable influence on the winding losses and the load dependency of the efficiency factor.

The division of the windings may be realized in various ways. It is possible to configure the main and auxiliary windings as two partial windings, one situated above the other, that extend across all phases. The main and auxiliary windings may be so configured, however, as to extend across only a portion of the expanse of the zone, as is the case with a machine with q=4 windings per pole and phase; alternating 3 windings for the main and 1 winding for the auxiliary winding. Still, it is advantageous (regarding balanced out current load and utilization of machinery), to select a smaller diameter and a higher number of turns for the auxiliary winding than for the main winding. In addition, the main and the auxiliary winding may be identical in their configuration or different.

DETAILED DESCRIPTION

In all the figures, the three phase conductors of the main winding are designated 1-3, and the phase conductors of the auxiliary winding of a polyphase motor are designated 4-6. The conductors of the main and auxiliary winding are wired in series so as to yield an increase of voltage. The commonly-shared connection points 7, 8, and 9 of the main and auxiliary windings 1, 4, or 2,5, or 3,6 serve simultaneously as connections for the network voltage phases R,S,T.

The condensers 13, 14, 15 are connected between the free connection ends 10, 11, 12 of the auxiliary winding 4-6. In this way, the condensers 13-15 are connected to the auxiliary winding 4-6 in a Δ-configuration.

Figure 1:
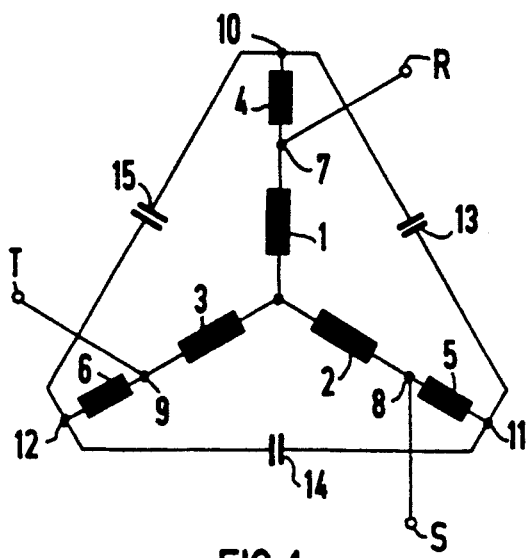
FIG. 1 shows the circuitry scheme of a motor stator winding with a main winding wired in Y-configuration and a auxiliary winding on the same axis lying in series.
Figure 2:
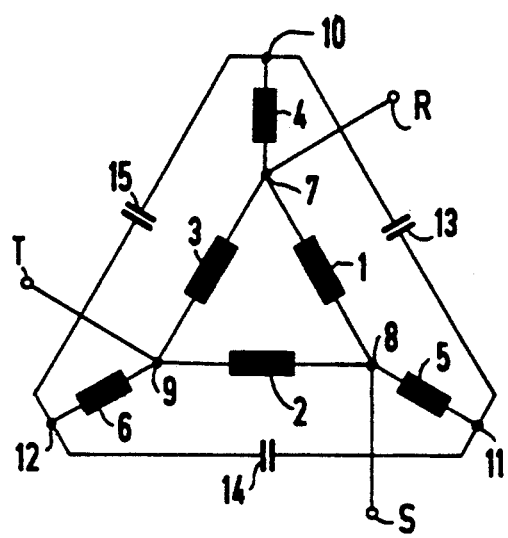
FIG. 2 shows the circuitry of a motor stator winding with a main winding wired in Y-configuration and a auxiliary winding in series set 30° out of phase.

The circuits in FIG. 1 and 2 differ in that in FIG 1, the main winding 1-3 is wired in a Y-configuration, and in FIG. 2 the main winding is wired in a Δ-configuration, such that the three auxiliary windings 4,5,6 in FIG. 1 are arranged so as to be on the same axis, and in FIG. 2, they are 30+ off the axis.

Figure 3:
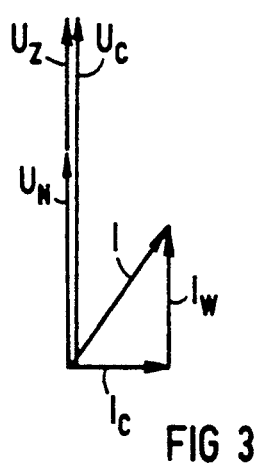
FIG. 3 shows a vector diagram for the current and voltage when the network voltage and condenser voltage are in-phase.
Figure 6:
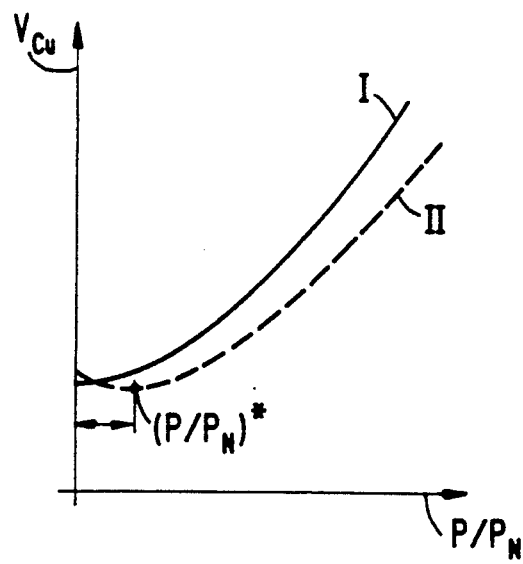
FIG. 6 shows the relationship of winding losses and the load on the motor.

In these two circuits the network voltage $U_N$ applied to the main winding 1-3 and the voltage $U_z$ in the auxiliary windings 4-6, as well as the vector total from $U_N$ and $U_z$, are in phase with the condenser voltage $U_c$ as shown in FIG. 3. The result is that the dependence of load upon winding losses (designated in FIG. 6 by Roman numeral I), in the case of no-load operation, (i.e. $P/P_N=0$) is at its minimum.

If the main and auxiliary windings are not arranged on the same axis, there is a shift of phase between the network voltage $U_N$ applied to the main winding 1-3, and the voltage $U_z$ of the auxiliary winding 4-6. The condenser voltage $U_c$ results from the vector addition of the main voltage $U_N$ and the voltage of auxiliary winding 4-6 $U_z$. In the case of condenser voltage $U_C$, it is consequently possible to achieve a shift of phase by the angle $\delta$ from the phase of the main voltage $U_N$.

Figure 4:
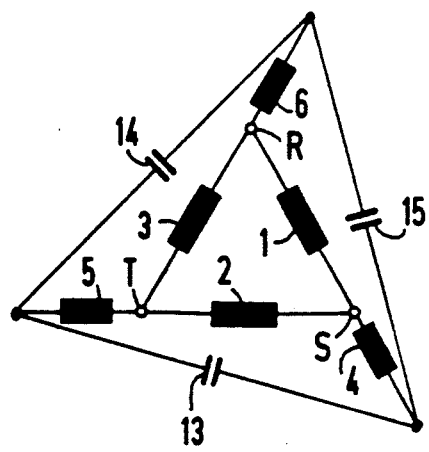
FIG. 4 shows the circuitry of a motor stator winding with a main winding wired in a Δ-configuration and a auxiliary winding in the same axis, and in series.

As FIG. 4 shows, a leading condenser voltage can be achieved, even in the case of main and auxiliary windings of the same axis.

Figure 5:
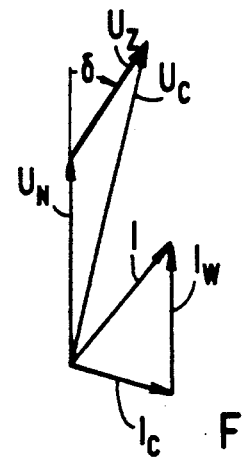
FIG. 5 shows a vector diagram for the current and voltage when there is a shift in axis between the main and auxiliary winding due to the leading condenser voltage.

As shown in FIG. 5, in the presence of leading condenser voltage $U_c$, total current I, which is formed of the capacitive leakage current component $I_c$ and the active current component $I_w$ flowing in the main winding, reaches a minimum partial load $(P/PN)^*$, at which there is a 90° shift of phase of the total $U_c$ with reference to the network voltage $U_N$. Accordingly, even the winding losses in keeping with curve II in FIG. 6 exhibit a minimum. Apart from a relatively narrow range around the no-load point, the winding losses, on the whole, are much lower than in the previous case (curve I in FIG. 5).

As a result of a condenser voltage $U_c$ leading the network voltage $U_N$ across from the main winding 1-3, the parabola-shaped curve of loss is shifted to the right so that the loss minimum in keeping with curve I at no-load operation is shifted to the motor's area of partial load. This leads to an improved degree of effectiveness on the part of the motor.

If a motor's condensers 13-15, the auxiliary winding 2-6, and the main windings 1-3 are firmly connected to one another, an advantageous leading of condenser voltage $U_c$ is possible in only one direction of rotation. If this direction of rotation is reversed, this lead becomes a lag of the voltage $U_c$ when compared with the main voltage $U_N$ in the main windings 1-3. This would result in greater losses.

When the motor's direction of rotation is reversed, it is therefore necessary that the auxiliary winding 4-6, with regard to its phase position, insofar as the main winding is concerned, be so reversed that even in this other direction of rotation, a lead in the condenser 13-15 voltage $U_c$ results.

In FIGS. 7-11, examples for a corresponding reversal are presented, for clockwise running on the right side of the illustration in each case, and for counterclockwise operation in the left half in each case such that in the individual figures, examples for various major shifts of phase $\delta$ are represented.

In all the wiring examples, the main winding may be wired either in a Y-configuration or in a Δ-configuration. For this reason, the circuitry examples shown exhibit alternating Δ- and Y-circuits. The individual winding conductors are depicted in each case in correct phase in the form of thicker lines. The network connections are designated by R,S,T.

Figure 7:
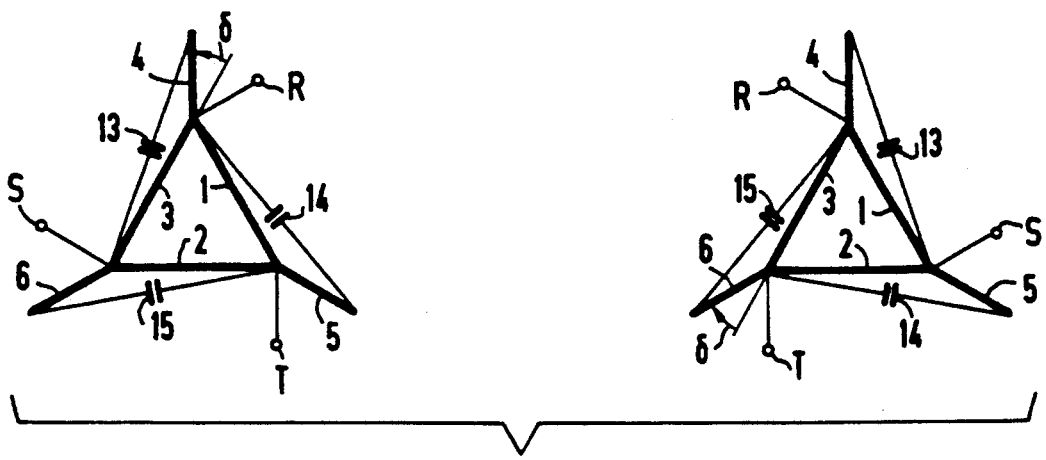
FIG. 7-11 show various wiring configurations to change the axis between the main and the auxiliary winding when the direction of rotation is reversed, such that in each case the left half of the picture shows the circuitry for counterclockwise rotation, and the right half of the picture shows the circuitry for clockwise rotation.
Figure 8:
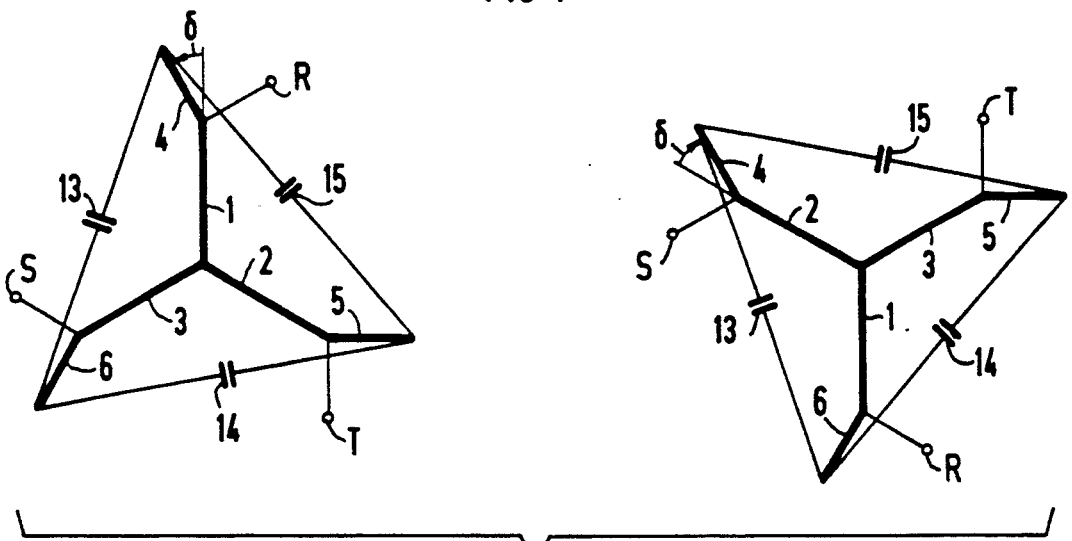

FIGS. 7 and 8 show two embodiments for a shift of phase of $\delta=30°$. According to FIG. 7, taking an arrangement of windings as in FIG. 2 as a point of departure, condensers 13-15 are connected with the free end of a conductor of the auxiliary winding 4-6 and the network connection S, or R, or T, respectively, of the adjacent phase (the adjacent phase in the counterclockwise direction for the figure on the left and the adjacent phase in the clockwise direction for the figure on the right). The condenser voltage can be reduced by additional conductors in the same phase.

In the case of the variant of FIG. 8, three of the conductors, 4-6 of the auxiliary winding are firmly connected at their free end to two of the condensers 13-15 15 which are Δ-wired. When changing the direction of rotation, the poles on the conductors of the main winding 1-3 are changed and connected in cyclically exchanged sequence with the free connection ends of the auxiliary winding. Specifically, main winding conductor 1 which had been connected to auxiliary winding conductor 4 (shown in the figure on the left of FIG. 8) is now connected to auxiliary winding conductor 6 (shown in the figure on the right of FIG. 8); main winding conductor 2 which had been connected to auxiliary winding conductor 5 (shown in the figure on the left of FIG. 8) is now connected to auxiliary winding conductor 4 (shown in the figure on the right of FIG. 8); and main winding conductor 3 which had been connected to auxiliary in the figure on the left of FIG. 8) is now connected to auxiliary winding conductor 5 (shown in the figure on the right of FIG. 8). Apart from the three connections of auxiliary winding 4-6, all six ends of the main winding, 1-3 are needed. At this wiring variant, the condenser voltage achieves its maximum possible value.

Figure 9:
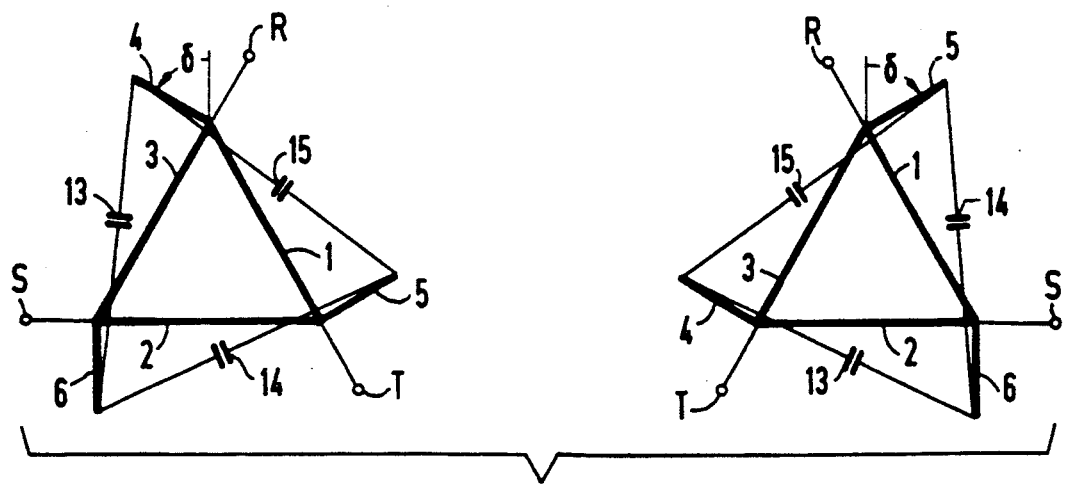

In FIG. 9, an example of the wiring for a shift of phase of $\delta=60°$ is shown. In this case, an end of the three conductors of the auxiliary winding 4-6 is firmly linked to the Δ-wired condensers 13-15 to a compensation unit. The free ends of the auxiliary windings 4-6 are connected to the main windings 1-3 when the direction of rotation is reversed in reversed phase order. Specifically, the auxiliary winding conductor 4 which had been connected to main winding conductors 1 and 3 (as in the figure on the left of FIG. 9) is now connected to main winding conductors 2 and 3 (as shown in the figure on the right of FIG. 9); the auxiliary winding conductor 5 which had been connected to main winding conductors 1 and 2 (as in the figure on the left of FIG 9) is now connected to main winding conductors 1 and 3 (as shown in the figure on the right of FIG. 9); and the auxiliary winding conductor 6 which had been connected to main winding conductors 2 and 3 (as in the figure on the left of FIG. 9) is now connected to main winding conductors 1 and 2 (as shown in the figure on the right of FIG. 9). A change in the polarity of the main winding 1-3 is not necessary in this process, so that the latter may remain firmly wired in Y-configuration or a Δ-configuration. In this way, a total of only six circuit terminals is required. Once again, the condenser voltage reaches its maximum level. If, in this wiring variant, the conductors of the auxiliary winding 4-6 are connected in the opposite direction, a shift of phase of $\delta = 120°$ is obtained.

Figure 10:
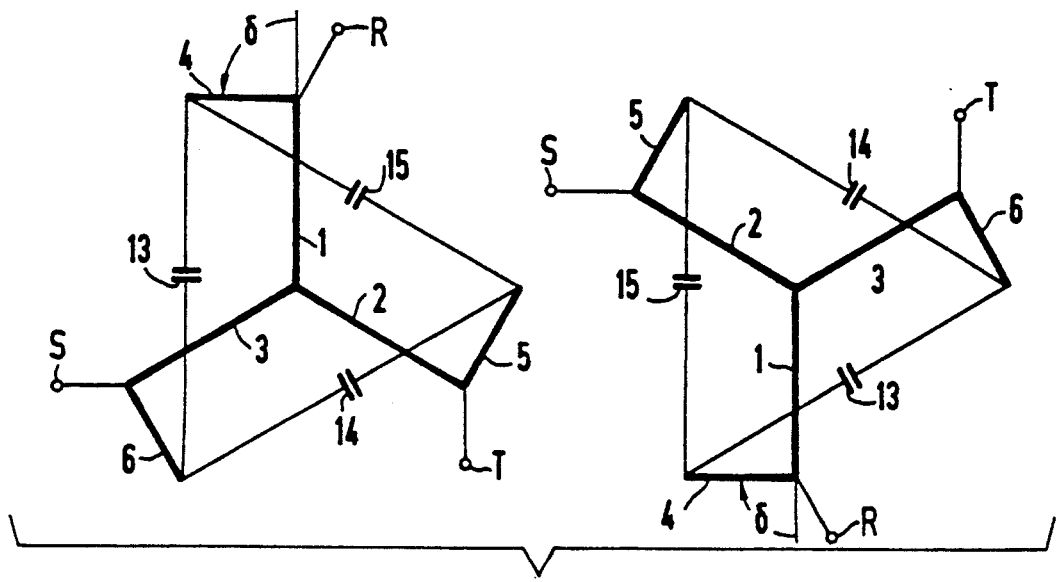
Figure 11:
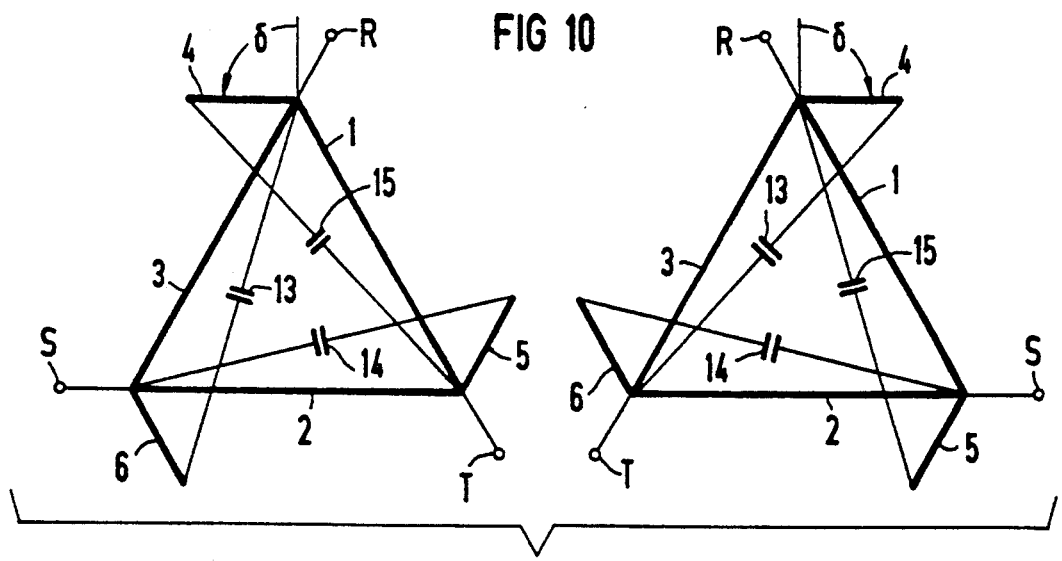

Two wiring possibilities for a shift of phase of $\delta = 90°$ are shown in FIGS. 10 and 11. The wiring variant in FIG. 10 corresponds, in its underlying structure, and, in terms of the reversal procedures, to the variant illustrated in FIG. 8. In each case, one end of the conductor of the auxiliary winding 4-6 is solidly connected to a corner point of the Δ-wiring of condensers 13-15. When the direction of rotation is changed, the polarity is changed, the polarity on the conductors of the main winding 1-3 is changed and connected in cyclically transposed sequence with the free ends of the auxiliary winding.

In the case of the embodiment in keeping with FIG. 11, the main winding is firmly wired in a Δ-configuration. A Y-configuration is also possible. Here the three conductors of the auxiliary winding 4-6 are connected in alternating sequence with the condensers 13-15 to a compensation unit that forms a closed circuit. For reversal, all six connection points are needed. The condensers 13-15, in both phases of the operation, are between the end of the branch of the auxiliary winding 4-6, and the network voltage R,S,T of an adjacent phase. In the case of the wiring variant of FIG. 10, $$\frac{U_C}{U_{Ph}} = \sqrt{3(1 + X^2)}$$

applies for the voltage adjacent to the condenser. In the case of the wiring variant of FIG. 11, $$\frac{U_C}{U_{Ph}} = \sqrt{3 + \sqrt{3} X + X^2}$$

applies.

In these equations, the following definitions apply:
$U_C$ = Condenser voltage
$U_{Ph}$ = phase voltage of the main winding $$U_{Ph} = \frac{U_N}{\sqrt{3}}$$

X = Transfer ratio: auxiliary winding to main winding $$X = \frac{U_Z}{U_{Ph}}$$

$U_N$ = phase-to-phase network voltage.

In the case of the wiring configuration of FIG. 11, the condenser voltage lies within the range X = 3/2 by up to 5% higher than in the wiring configuration of FIG. 10.

Figure 12:
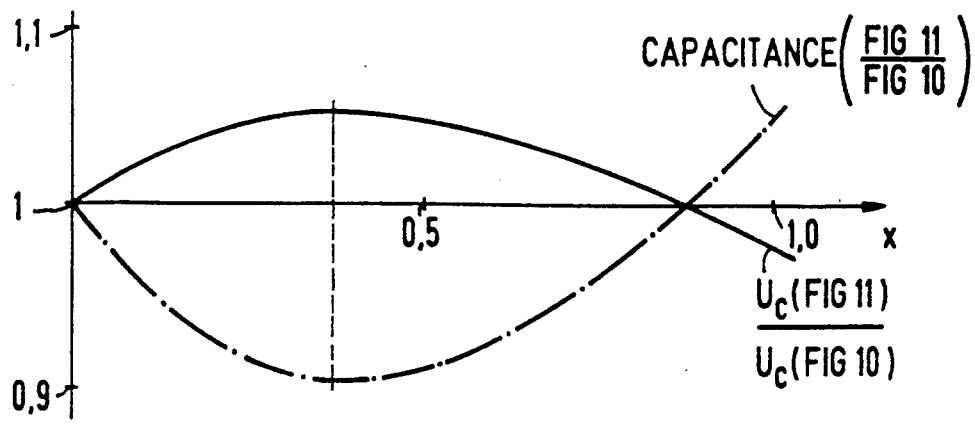
FIG. 12 shows the capacitance readings of the condensers in relation to the voltage ratio for the circuitry of FIGS. 10 and 11.

In FIG. 12, the ratio of the condenser voltage of the wiring configuration of FIG. 11 with a fully extended line is shown as it relates to the wiring configuration of FIG. 10 as it depends upon transfer ratio X. In keeping with these developments insofar as the voltage is concerned, the result is a quadratically reciprocal diminution of the size of the condensers, the broken line in FIG. 12.

As can be seen from the representation in FIG. 12, the wiring configuration in FIG. 10 leads to higher voltages, and thus, to smaller condensers only in the presence of a relatively high number of turns $$X > \frac{\sqrt{3}}{2}. \text{ For } X < \frac{\sqrt{3}}{2} \text{ the}$$

wiring variant in FIG. 11 is more favorable.

It is advantageous if the main and auxiliary windings are designed in the shape of superimposed partial windings which respectively extend over all the slots of the partial windings. Also, it is advantageous if the coils in the main windings alternately only cover a respective partial area of the zone width.

What is claimed is:

1. An alternating current motor having a plurality of phases comprising:
    a) a stator;
    b) a plurality of main windings coupled to a network voltage having a phase number and having a plurality of main winding conductors;
    c) a plurality of auxiliary windings arranged in the stator having the phase number of the plurality of main windings and having a plurality of auxiliary winding conductors, wherein the plurality of auxiliary winding conductors are series coupled to the plurality of main winding conductors thereby forming a plurality of series coupled main and auxiliary windings;
    d) a plurality of condensers, one for each phase, coupled to the plurality of main and auxiliary windings, wherein each of the plurality of condensers are coupled in parallel to one of the plurality of series coupled main and auxiliary windings which are series coupled to increase a voltage applied to the plurality of condensers above the network voltage, the plurality of auxiliary windings is arranged such that a condenser voltage applied to one of the plurality of condensers leads the network voltage applied to a respective main winding of the plurality of main windings, and the plurality of condensers are coupled to the main and auxiliary windings such that in the plurality of auxiliary windings only a capacitative leakage current flows, and in the plurality of main windings a geometric total of an active current and the capacitive leakage current flows.

2. An alternating current motor which has a reversible rotation and has a plurality of phases, comprising:
    a) a stator;
    b) a plurality of main windings coupled to a network voltage having a phase number and having a plurality of main winding conductors;
    c) a plurality of auxiliary windings arranged in the stator having the phase number of the plurality of main windings and having a plurality of auxiliary winding conductors, wherein the plurality of auxiliary winding conductors are series coupled to the plurality of main winding conductors thereby forming a plurality of series coupled main and auxiliary windings;
    d) a plurality of condensers one for each phase, coupled to the plurality of main and auxiliary windings, wherein each of the plurality of condensers are coupled in parallel to one of the plurality of series coupled main and auxiliary windings which are series coupled to increase a voltage applied to the plurality of condensers above the network voltage, the plurality of auxiliary windings is arranged such that a condenser voltage applied to one of the plurality of condensers leads the network voltage applied to a respective main winding of the plurality of main windings, and the plurality of condensers are coupled to the main and auxiliary windings such that in the plurality of auxiliary windings only a capacitative leakage current flows, and in the plurality of main windings a geometric total of an active current and the capacitive leakage current flows, and when a direction of rotation is changed, a shift of phase of the condenser voltage can also be reversed.

3. The motor according to claim 1, further comprising a plurality of commonly shared coupling points coupled to the plurality of main and auxiliary windings, wherein each of said plurality of auxiliary winding conductors further comprises a free end and each of said plurality of condensers further comprise a first end coupled to the free end and a second end coupled via one of the plurality of auxiliary winding conductors to the commonly-shared coupling point of an adjacent conductor of the plurality of auxiliary winding conductors, which adjacent conductor is also a network termination.

4. The motor according to claim 2, further comprising a plurality of commonly shared coupling points coupled to the plurality of main and auxiliary windings, wherein each of said plurality of auxiliary winding conductors further comprises a free end and each of said plurality of condensers further comprise a first end coupled to the free end and a second end coupled via one of the plurality of auxiliary winding conductors to the commonly-shared coupling point of an adjacent conductor of the plurality of auxiliary winding conductors, which adjacent conductor is also a network termination.

5. The motor according to claim 1, further comprising a plurality of reversal connections, wherein the plurality of condensers further comprises being firmly wired in a Δ-wiring to one another, the Δ-wiring having a corner, wherein said plurality of auxiliary winding conductors further comprises a first end firmly coupled to the corner of the Δ-wiring, and a free end, and wherein said plurality of main windings further comprises a connecting end Δ-wired with the free end to form the plurality of reversal connections.

6. The motor according to claim 2, further comprising a plurality of reversal connections, wherein the plurality of condensers further comprises being firmly wired in a Δ-wiring to one another, the Δ-wiring having a corner, wherein said plurality of auxiliary winding conductors further comprises a first end firmly coupled to the corner of the Δ-wiring, and a free end, and wherein said plurality of main windings further comprises a connecting end Δ-wired with the free end to form the plurality of reversal connections.

7. The motor according to claim 1, further comprising a plurality of reversal connections, wherein the plurality of condensers further comprises being firmly wired in a Δ-wiring to one another, the Δ-wiring having a corner, wherein said plurality of auxiliary winding conductors further comprises a first end firmly coupled to the corner of the Δ-wiring, and a free end, and wherein said plurality of main windings further comprises a connecting end Y-wired with the free end to form the plurality of reversal connections.

8. The motor according to claim 2, further comprising a plurality of reversal connections, wherein the plurality of condensers further comprises being firmly wired in a Δ-wiring to one another, the Δ-wiring having a corner, wherein said plurality of auxiliary winding conductors further comprises a first end firmly coupled to the corner of the Δ-wiring, and a free end, and wherein said plurality of main windings further comprises a connecting end Y-wired with the free end to form the plurality of reversal connections.

9. The motor according to claim 5, wherein the plurality of main windings further comprises a firmly connected Δ-configuration.

10. The motor according to claim 5, wherein the plurality of main windings further comprises a firmly connected Y-configuration.

11. The motor according to claim 2, further comprising a plurality of switching connections, wherein the plurality of main windings conductors further comprises a plurality of terminal ends, and wherein the plurality of auxiliary windings conductors further comprises a first end firmly connected to the plurality of terminal ends, and a second end firmly connected to one of the plurality of condensers, and wherein the plurality of condensers further comprise a plurality of free ends forming the plurality of switching connections.

12. The motor according to claim 3, further comprising a plurality of switching connections, wherein the plurality of main windings conductors further comprises a plurality of terminal ends, and wherein the plurality of auxiliary windings conductors further comprises a first end firmly connected to the plurality of terminal ends, and a second end firmly connected to one of the plurality of condensers, and wherein the plurality of condensers further comprise a plurality of free ends forming the plurality of switching connections.

13. The motor according to claim 4, further comprising a plurality of switching connections, wherein the plurality of main windings conductors further comprises a plurality of terminal ends, and wherein the plurality of auxiliary windings conductors further comprises a first end firmly connected to the plurality of terminal ends, and a second end firmly connected to one of the plurality of condensers, and wherein the plurality of condensers further comprise a plurality of free ends forming the plurality of switching connections.

14. The motor according to claim 2, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Δ-configuration forming the switching connections.

15. The motor according to claim 3, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Δ-configuration forming the switching connections.

16. The motor according to claim 3, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Δ-configuration forming the switching connections.

17. The motor according to claim 2, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Y-configuration forming the switching connections.

18. The motor according to claim 3, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Y-configuration forming the switching connections.

19. The motor according to claim 3, further comprising a plurality of switching connections, wherein the plurality of main winding conductors further comprises a plurality of terminal ends, and the plurality of auxiliary winding conductors and the plurality of condensers are arranged in an alternating sequence forming a closed circuit and also forming a plurality of coupling points which are coupled to the plurality of terminal ends and the plurality of main winding conductors are arranged in a Y-configuration forming the switching connections.

20. The motor according to claim 1, wherein said plurality of main and auxiliary windings comprise two partial windings, one superimposed over the other, which extend across slots of the plurality of auxiliary and main winding conductors.

21. The motor according to claim 1, wherein the plurality of main and auxiliary windings alternately cover a partial area of a zone width.

22. The motor according to claim 1, wherein the plurality of auxiliary windings have a higher number of windings than the plurality of main windings.

* * * * *